May 26, 1959 C. ANDERSON 2,888,245
FENCE POST DRIVING MEANS
Filed May 10, 1955
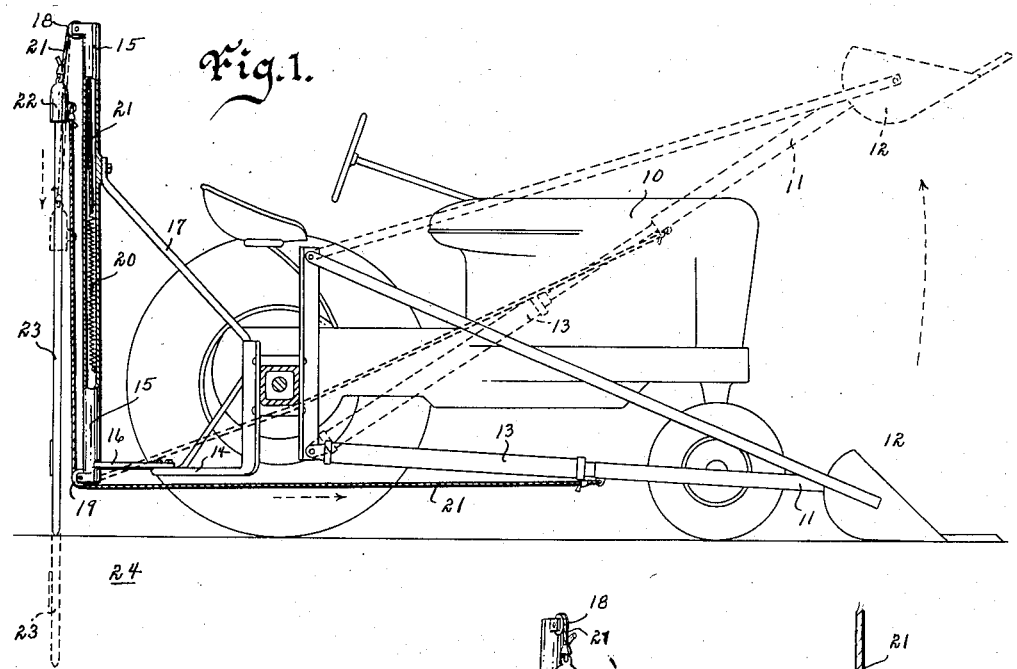
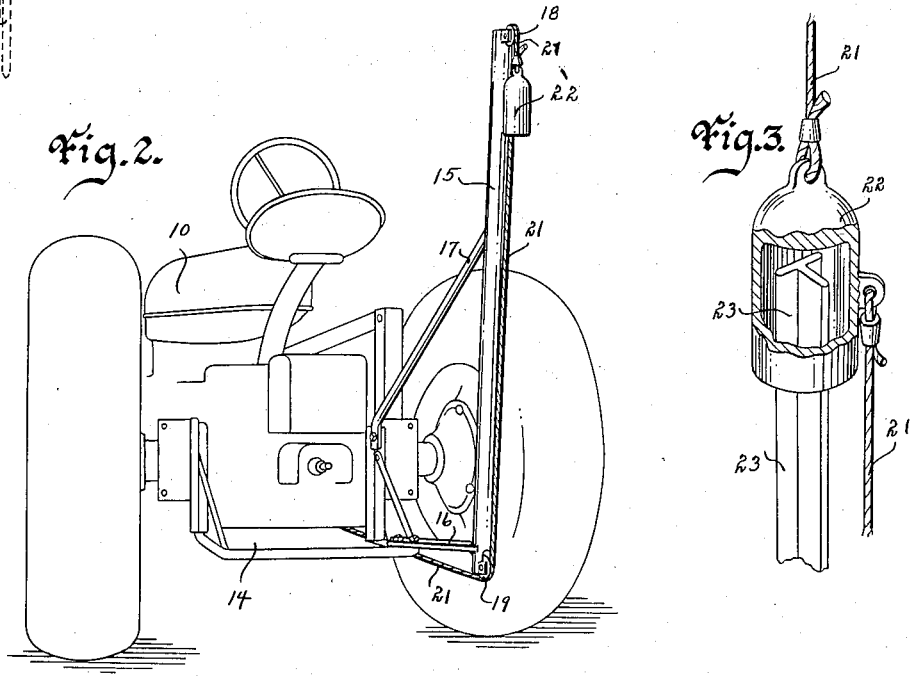
Inventor
Clarence Anderson
by Talbert Dick & Adler
Attorneys
Witness
Edward P. Seeley

United States Patent Office 2,888,245
Patented May 26, 1959

2,888,245

FENCE POST DRIVING MEANS

Clarence Anderson, Zearing, Iowa

Application May 10, 1955, Serial No. 507,349

1 Claim. (Cl. 254—29)

This invention relates to the installation of posts such as fence posts in the ground and more particularly to a post driving means associated with a tractor loader.

There are various types of mechanical devices for driving fence posts into the ground, thus saving the labor of digging fence post holes. However, these devices are rather complicated and expensive.

Therefore, one of the objects of my invention is to provide a simple fence post driver that is attached to and obtains its motive power from an ordinary farm tractor having a hydraulic jack operated shovel.

A further object of this invention is to provide a post driving means that may be easily and quickly attached to an ordinary farm tractor loader.

A still further object of my invention is to provide a post driver for tractor loaders that is within reach of and under complete observation of the driver of the tractor.

Still further objects of this invention are to provide a post driver that is economical in manufacture, and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

Fig. 1 is a side view of my post driver installed on a tractor loader with broken lines showing its operation, Fig. 2 is a rear perspective view of a tractor with my device installed and more fully illustrating its construction, and Fig. 3 is an enlarged sectional view of the bell head for engagement with the upper end of a fence post.

As hereinbefore indicated, I attach my device to an ordinary loader tractor. In the drawings I have used the numeral 10 to designate an ordinary tractor having the usual extendable loader beam 11, shovel 12, and hydraulic jack 13. Such hydraulic jack for lowering and raising the shovel lifting beam by expanding and contracting the same is connected to a hydraulic pump (not shown) but which is connected to the internal combustion engine of the tractor. The numeral 14 designates the back step platform of the tractor.

It is to such equipment that I install my metal fence post driver and which I will now describe in detail. The numeral 15 designates a vertical tube pipe secured to the back of the tractor by braces 16 and 17. These braces run to the step 14 and tractor frame respectively, as shown in Fig. 2. I recommend they be secured to the tractor by bolt means for quick attachment of the device to the tractor and detachment from the tractor. The elongated tubular member 15 is positioned to the right rear side of the tractor and substantially in the same longitudinal plane with the right side beam 11 of the loader mechanism. The numeral 18 designates a pulley wheel rotatably mounted on the top rear side of the tube pipe 15, as shown in Fig. 1. The numeral 19 designates a similar pulley wheel rotatably mounted on the bottom rear end of the pipe 15 and directly below the pulley wheel 18. The numeral 20 designates an elongated coil spring inside of the pipe tube 15 and having its lower end rigidly secured to the member 15. The numeral 21 designates a flexible cable having one end secured to the top of the spring 20, extending upwardly through the tube pipe 15, thence over the pulley wheel 18, thence downwardly around the pulley wheel 19, and thence forwardly where it is secured to the beam 11 of the shovel mechanism. If desired the forward end of this flexible cable may be secured to the piston shaft of the hydraulic jack 13, the operation and result being the same.

The numeral 22 designates an inverted cup member or bell imposed in the upper end portion of the flexible cable 21 as shown in Fig. 3. This member 22 moves with the cable 21 directly below the pulley wheel 18. The member 22 may be imposed or secured to the cable in any suitable manner. However, in the drawings I cut the cable with the top portion of the cable secured to the top of the member 22, and the other part of the cable secured at a lower position to the side of the same, thereby maintaining the member 22 in inverted condition for receiving the upper end portion of a metal fence post 23.

The practical operation of my device is as follows: A selected fence post 23 is inserted into the member 22 and placed in a vertical position thereunder, as shown in Fig. 1. By actuating the hydraulically operated shovel, i.e., the movement of the shovel upwardly as shown by dotted lines, the beam 11 by being expanded will pull on the lower end of the cable 21 and against the action of the spring 20, thereby moving the bell like member 22 downwardly and forcing the post 23 into the ground 24, as shown by broken lines in Fig. 1. Merely by lowering the shovel loader the spring 20 will retrieve the other end of the cable 21, thereby elevating the bell head 22 and leaving the post which has just been driven into the ground. The tractor is then driven forwardly or rearwardly, as the case may be, for driving the next post. Obviously, the member 22 will be in an elevated position for receiving the upper end portion of the next post.

From the above it will be seen that my fence post driver is most simple in construction and operation, and a post may be driven into the ground merely by raising the loader shovel of the tractor.

Some changes may be made in the construction and arrangement of my fence post driving means without departing from the real spirit and purpose of my invention, and it is my intention to cover by my claim, any modified forms of structure or use of mechanical equivalents which may be reasonably included within its scope.

I claim:

In combination, a tractor having a hydraulic jack operated loader and a fence post driver; said fence post driver, comprising, a vertical pipe operatively secured to said tractor, a pulley wheel rotatably mounted on the upper end portion of said pipe, a pulley wheel rotatably mounted on the lower end portion of said pipe, a coil spring in said pipe having its lower end secured to said pipe, an inverted cup member, a flexible cable secured to the upper end of said coil spring, extending thence upwardly through said pipe, thence over said first pulley wheel and thence downwardly and attached to said inverted cup member, a second flexible cable secured to said inverted cup member, extending downwardly around said second pulley wheel, thence forwardly and then operatively secured to said loader whereby when said loader is elevated, said first and second cable will be drawn with it, carrying said cup member downwardly and against the yielding action of said coil spring, said cup member adapted to embrace the upper end portion of a fence post.

References Cited in the file of this patent

UNITED STATES PATENTS 2,244,899   Smith _____ June 10, 1941
2,645,453   Nelson _____ July 14, 1953